United States Patent
Koizumi

(10) Patent No.: US 10,661,403 B2
(45) Date of Patent: May 26, 2020

(54) TOOL CHANGER, MACHINE TOOL, AND METHOD FOR CHANGING TOOL

(71) Applicant: NAKAMURA-TOME PRECISION INDUSTRY CO., LTD., Hakusan, Ishikawa (JP)

(72) Inventor: Akira Koizumi, Nonoichi (JP)

(73) Assignee: NAKAMURA-TOME PRECISION INDUSTRY CO., LTD., Hakusan (JP)

(*) Notice: Subject to any disclaimer, the term of this patent is extended or adjusted under 35 U.S.C. 154(b) by 168 days.

(21) Appl. No.: 15/487,907

(22) Filed: Apr. 14, 2017

(65) Prior Publication Data
US 2017/0304973 A1   Oct. 26, 2017

(30) Foreign Application Priority Data
Apr. 22, 2016   (JP) .................. 2016-086007

(51) Int. Cl.
*B23Q 3/157* (2006.01)
*B23Q 11/08* (2006.01)
*B23Q 3/155* (2006.01)

(52) U.S. Cl.
CPC ..... *B23Q 3/15706* (2013.01); *B23Q 3/15526* (2013.01); *B23Q 11/08* (2013.01); *B23Q 2003/1553* (2016.11); *Y10T 483/10* (2015.01); *Y10T 483/115* (2015.01); *Y10T 483/1793* (2015.01); *Y10T 483/1798* (2015.01); *Y10T 483/1827* (2015.01)

(58) Field of Classification Search
CPC .............. Y10T 483/10; Y10T 483/115; Y10T 483/179; Y10T 483/1793; Y10T 483/1795; Y10T 483/1798; Y10T 483/1818; Y10T 483/1827; B23Q 3/15506; B23Q 2003/15528; B23Q 2003/1553

USPC .................... 483/1, 3, 54, 55, 56, 57, 60, 61
See application file for complete search history.

(56) References Cited

U.S. PATENT DOCUMENTS

| | | | | |
|---|---|---|---|---|
| 3,171,327 A * | 3/1965 | Williamson | ....... | B23Q 3/15706 409/80 |
| 6,648,806 B2 * | 11/2003 | Menzio | ............. | B23Q 3/15533 414/273 |
| 7,108,647 B2 * | 9/2006 | Nakazawa | ............... | B23Q 1/66 29/33 P |
| 7,229,395 B2 * | 6/2007 | Yoshida | ............. | B23Q 11/0891 483/3 |
| 8,308,621 B2 * | 11/2012 | Shih | ................... | B23Q 3/15706 409/136 |

(Continued)

FOREIGN PATENT DOCUMENTS

| | | |
|---|---|---|
| DE | 3136391 A1 | 3/1983 |
| FR | 2907357 A1 | 4/2008 |
| JP | 2005-103650 A | 4/2005 |

OTHER PUBLICATIONS

Sep. 13, 2017 Extended European Search Report issued in European Patent Application No. 17167005.2.

*Primary Examiner* — Erica E Cadugan
*Assistant Examiner* — Michael J Vitale
(74) *Attorney, Agent, or Firm* — Oliff PLC

(57) ABSTRACT

A tool changer includes at least one tool changer unit, wherein the at least one tool changer unit includes: a tool holder that receives and holds a tool; a base member that supports the tool holder so that the tool holder can be slid along a longitudinal direction of the tool; and a moving mechanism that slides the tool holder relative to the base member.

4 Claims, 3 Drawing Sheets

(56) References Cited

U.S. PATENT DOCUMENTS

| | | | | |
|---|---|---|---|---|
| 2007/0004572 A1* | 1/2007 | Arai | ................... | B23Q 3/1554 |
| | | | | 483/36 |
| 2013/0331245 A1* | 12/2013 | Koike | ............... | B23Q 3/15526 |
| | | | | 483/54 |
| 2017/0066094 A1* | 3/2017 | Hoshi | ............... | B23Q 3/15706 |

* cited by examiner

TOOL CHANGER, MACHINE TOOL, AND METHOD FOR CHANGING TOOL

Japanese Patent Application No. 2016-086007 filed on Apr. 22, 2016, is hereby incorporated by reference in its entirety.

BACKGROUND

The present invention relates to a tool changer that is used for a machine tool, and the like. In particular, the invention relates to a tool changer, a machine tool, and a method for changing a tool that are suitable for a long tool (i.e., a tool of long length).

A machine tool (e.g., lathe and multi-tasking machine) that utilizes a plurality of tools is provided with an auto tool changer (ATC) unit that includes an ATC and a tool magazine.

However, the tool magazine included in the ATC unit is normally limited as to the length of the tool that can be received therein in order to provide a number of tools.

A long tool may be required to work a long workpiece. The invention was conceived as a result of conducting studies with regard to a tool changer that is suitable for a long tool.

JP-A-2005-103650 discloses a tool changer that includes a tool support plate that positions and holds a tool in a laid-down state, and approximately extends in a horizontal plane.

However, since the structure disclosed in JP-A-2005-103650 is characterized in that a long tool is moved horizontally in a transverse direction that is orthogonal to the longitudinal direction of the long tool, a large receiving space is required for the tool changer, and it is difficult to conserve space.

SUMMARY

An object of the invention is to provide a tool changer, a machine tool, and a method for changing a tool that make it possible to receive a long tool using a small space, and deal with tools that differ in length.

According to one aspect of the invention, there is provided a tool changer comprising:
at least one tool changer unit,
wherein the at least one tool changer unit comprises:
a tool holder that receives and holds a long tool;
a base member that supports the tool holder so that the tool holder can be slid along a longitudinal direction of the long tool; and
a moving mechanism that slides the tool holder relative to the base member.

The tool changer may comprise:
a plurality of the tool changer units that are provided parallel to each other in the longitudinal direction.

Since the long tool is held so that it can be slid in the longitudinal direction, it is possible to conserve the receiving space with respect to the tool changer.

It is possible to implement an auto tool changer by automatically controlling the slide movement of the tool holder.

In the tool changer,
wherein the tool holder may comprise a holding member that sandwiches and holds the long tool when the long tool is moved downward, and may release the long tool when the long tool is moved upward.

In the tool changer,
wherein the holding member may comprise a pair of clamp arms that are open on an upper side, and the pair of clamp arms are biased in a direction in which the pair of clamp arms are closed.

According to this configuration, since it is possible to hold and release the long tool using the holder by merely moving the long tool upward and downward, it is unnecessary to drive the holder using a drive source.

Note that only one tool holder may be provided corresponding to one tool or a plurality of tools.

In the tool changer,
wherein the holding member may be moved forward along the longitudinal direction toward a delivery position at which the tool is delivered, and
the holding member may be provided at a front end of the tool holder in a forward moving direction.

According to this configuration, it is possible to stop the tool holder at a constant forward position or backward position, and hold the tool using the holder, irrespective of the length of the tool. Therefore, it is unnecessary to change the forward position or the backward position corresponding to the length of the tool.

The tool changer according to one aspect of the invention can deal with a tool having a standard length, and can also deal with a long tool having a length of 300 mm or more, for example.

The tool changer may further comprise:
a shutter that is opened and closed along a direction that intersects a forward moving path of the tool holder,
wherein the holding member may protrude outward from an opening-closing position of the shutter when set to the delivery position of the tool.

Since the tool holder that is moved along the longitudinal direction of the tool can deliver the tool by placing the tool at a position outward from the opening-closing position of the shutter, it is possible to conserve space.

According to another aspect of the invention, there is provided a machine tool comprising the above tool changer.

The shutter separates the working area from an area other than the working area when used for the machine tool that includes the tool changer, and the tool changer unit may be provided in an area other than the working area.

In this case, since a tool that is not used for working is received in an area other than the working area, the tool is not exposed to chips and the like.

The tool changer unit may include a means that blows air to the tool that has been returned to an area other than the working area.

The machine tool that utilizes the tool changer described above can automatically change a tool by controlling the movement of the tool rest to which the tool shaft is provided so as to be turnable.

According to still another aspect of the invention, there is provided a method for changing a tool comprising:
opening a shutter;
selecting one tool changer unit that holds a desired tool from a plurality of tool changer units;
moving a tool holder of the selected one tool changer unit forward along a longitudinal direction of a tool that is held by the tool holder to place a front end of the tool at a position outward from the shutter;
moving a tool rest toward the tool, and causing a tool shaft that is provided to the tool rest to chuck the tool; and
moving the tool rest upward to remove the tool from the tool holder.

In this case, a sensor that detects whether or not a tool is being clamped may be provided to each tool changer unit.

Since the tool changer, the machine tool, and the method for changing a tool according to the invention hold the long tool so that it can be slid in the longitudinal direction, it is possible to directly receive and deliver the long tool using the tool shaft in a state in which the shank of the tool protrudes into the working area of the machine tool.

This makes it possible to provide the tool changer according to the invention in the space of the machine tool (e.g., a space around the main spindle of a multi-tasking machine that chucks a workpiece). Therefore, it is possible to conserve space, and achieve high efficiency.

DESCRIPTION OF EXEMPLARY EMBODIMENTS

An example of the structure of a tool changer according to the exemplary embodiments of the invention is described below with reference to the drawings. Note that the invention is not limited thereto.

Figure 1A:
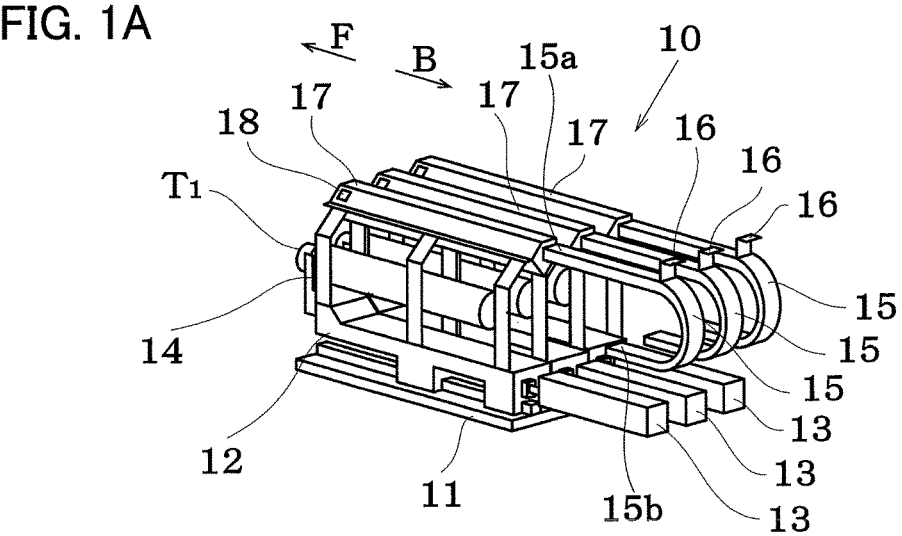
FIG. 1A is an external view illustrating a tool changer according to one embodiment of the invention in a state in which each tool (long tool) is placed at a backward position.
Figure 1B:
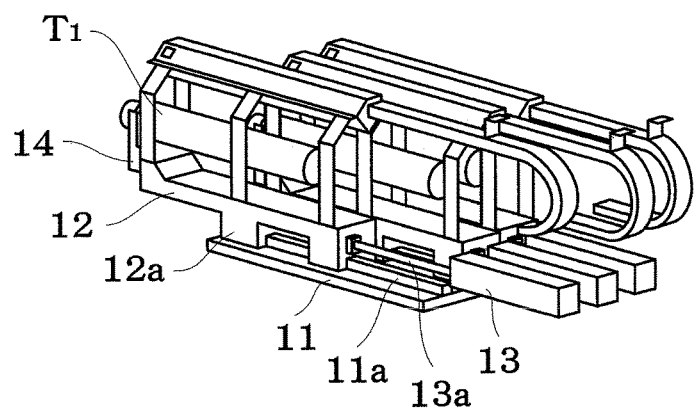
FIG. 1B is an external view illustrating a tool changer according to one embodiment of the invention in a state in which a tool T1 has been moved forward.
Figure 1C:
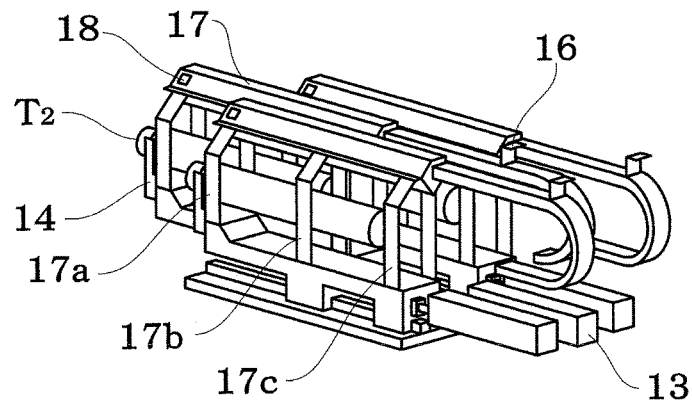
FIG. 1C is an external view illustrating a tool changer according to one embodiment of the invention in a state in which a tool T2 has been moved forward.

FIGS. 1A to 1C are external views illustrating a tool changer 10.

FIGS. 1A to 1C illustrate an example in which three tool changer units are provided parallel to each other. An arbitrary number of tool changer units may be provided.

Common reference signs and numbers are used for each tool changer unit.

The tool changer unit includes a base member 11, and a tool holder 12 that is slidable relative to the base member 11 along the longitudinal direction of a tool T. The tool holder 12 moves forward in the forward direction F and backward in the backward direction B as illustrated in FIG. 1A along the longitudinal direction of the tool T.

A clamp 14 (holding member) that holds the tool T is provided to the front end of the tool holder 12 in the forward direction F.

In the example illustrated in FIGS. 1A to 1C, a linear motion (LM) guide that includes an LM rail 11a and an LM block 12a is used as a slide moving mechanism, and a rod 13a of an air cylinder 13 (drive source) is connected to the rear end of the tool holder 12 in the forward direction F.

The tool holder 12 is configured so that a case 17 is supported by the upper part of brackets 17a to 17c that are vertically provided on each side of the tool holder 12, and the tool T is received in the space formed under the case 17.

A sensor 18 that detects whether or not the tool T is present, an air blow nozzle (not illustrated in the drawings), and the like are provided inside the case 17.

The sensor 18 is used to check whether or not the tool T is being held by the tool holder 12, and the air blow nozzle is used to remove chips and the like from the tool T that has been returned to the tool changer unit by blowing air.

A flexible pedestal 15 may be provided to movably hold a cable and a pipe connected to the sensor 18 and the air blow nozzle.

Parts for protecting and guiding cables and tubes connected to movable parts such as CABLEVEYOR (registered trademark) may be used as the flexible pedestal 15, for example. The flexible pedestal 15 is configured so that a cable and the like are supported and guided between a moving end 15a (that is connected to the case 17 that moves) and a fixed end 15b, while the position of the U-shaped bent part changes so as to maintain a constant radius, for example. The fixed end 15b of the flexible pedestal 15 is secured using a bracket (not illustrated in the drawings). A proximity dock 16 is provided to the flexible pedestal 15. An air cylinder 13 is driven by a proximity switch and a control section (not illustrated in the drawings), and stopped at the forward position (tool delivery position) and the backward position (tool reception position) of the tool holder 12.

Figure 3A:
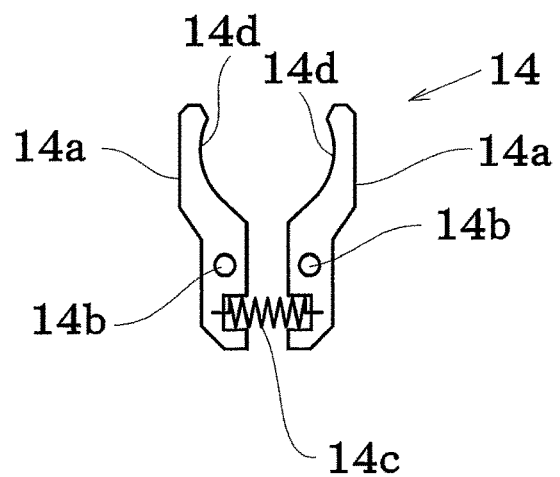
FIGS. 3A to 3C illustrate an example (motion) in which a tool is received and held by a holding member.

FIG. 3A illustrates an example of the structure of the holding member 14 (clamp) that holds the tool T.

The clamp 14 includes right and left clamp arms 14a that make a pair and are rotatably provided to a bracket (not illustrated in the drawings) secured on the tool holder 12 using shafts 14b. The clamp arms 14a are biased by a spring material 14c in the direction in which the clamp arms 14a are closed (i.e., the direction in which the upper opening becomes narrow).

Figure 3B:
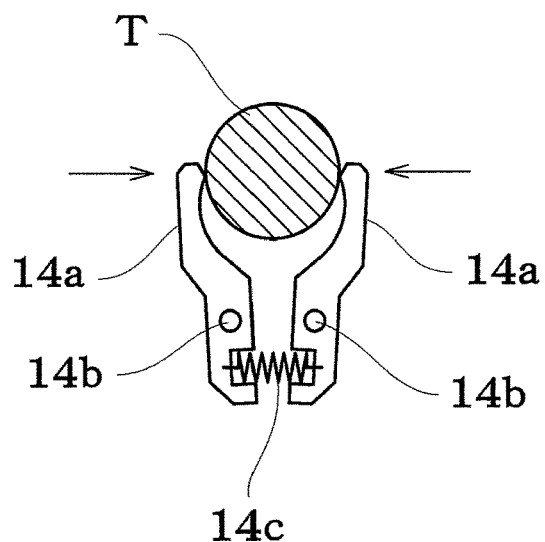

When the tool T that is situated above the clamp 14 is moved downward, clamping sections 14d are pressed outward by the outer circumferential part of the tool T against the biasing force indicated by the arrows (see FIG. 3B).

Figure 3C:
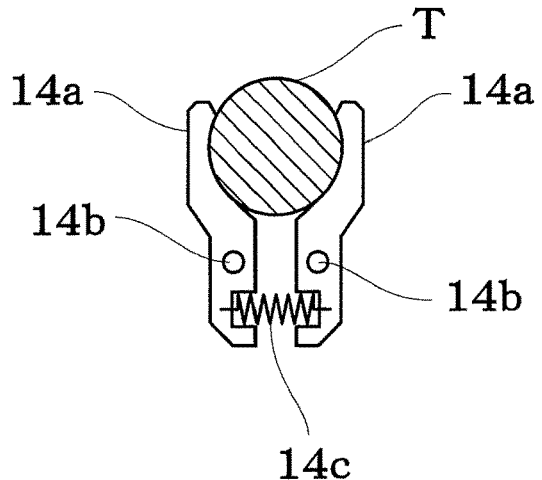

When the tool T is further moved downward, the tool T is sandwiched and held between the arc-shaped clamping sections 14d (see FIG. 3C).

Note that the tool T is removed by performing the above steps in reverse order.

A step that delivers the tool to a tool shaft 21 of a tool rest 20 is described below with reference to FIGS. 2A to 2D.

FIGS. 2A to 2D illustrate the motion of the tool T, and the case 17 and the brackets 17a to 17c of the tool changer unit, the flexible pedestal 15, and the like are omitted.

The tool shaft 21 chucks the tool T that is used for machining. The tool shaft 21 is provided to the tool rest 20 in a state in which the tool shaft 21 can be turned.

The tool rest 20 is moved in the working area in an X-axis direction, a Y-axis direction, and a Z-axis direction that are orthogonal to each other.

An area 30 in which the tool changer 10 is placed is separated by a shutter 31 of the tool changer 10 from the working area in which the tool rest 20 is placed.

When the tool shaft 21 has approached the shutter 31 (see FIG. 2A), the shutter 31 is opened by the control section (not illustrated in the drawings) in synchronization with the approach motion, is driven (see FIG. 2B), and the tool holder 12 is moved forward to a given forward position by operating the air cylinder 13. In this case, the forward position (tool delivery position) of the tool holder 21 may be set to a constant position irrespective of the length of the tool T. When the tool changer 10 includes a plurality of tool changer units, one tool changer unit that holds the desired tool is selected by the control section from the plurality of tool changer units, and the tool holder 12 included in the selected tool changer unit is moved forward.

The tool shaft 21 then chucks the shank of the tool T (see FIG. 2B) under control of the control section (not illustrated in the drawings).

When the tool rest 20 is moved upward (see FIG. 2C) under control of the control section (not illustrated in the drawings), the tool T is removed from the clamp 14.

Figure 2A:
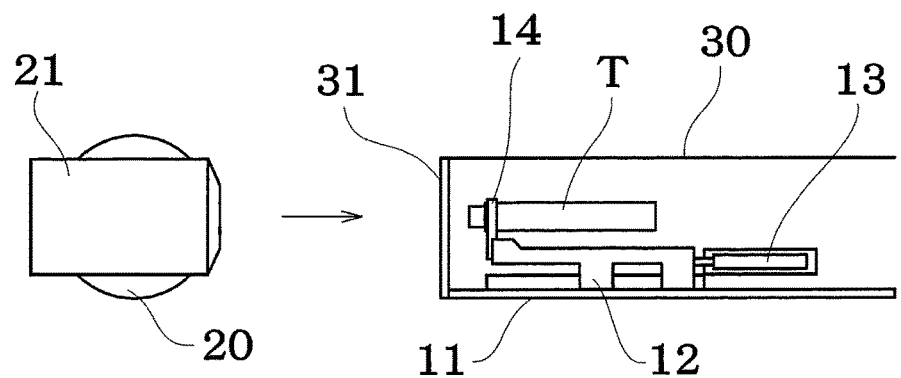
FIGS. 2A to 2D schematically illustrate a flow in which a tool is delivered to a tool shaft that is provided to a tool rest.
Figure 2B:
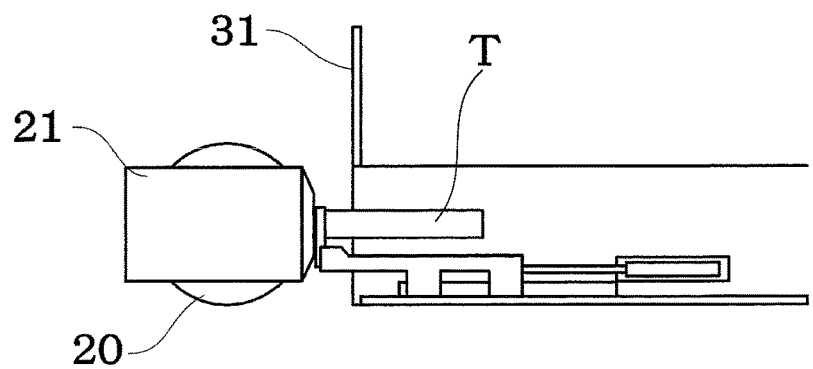
Figure 2C:
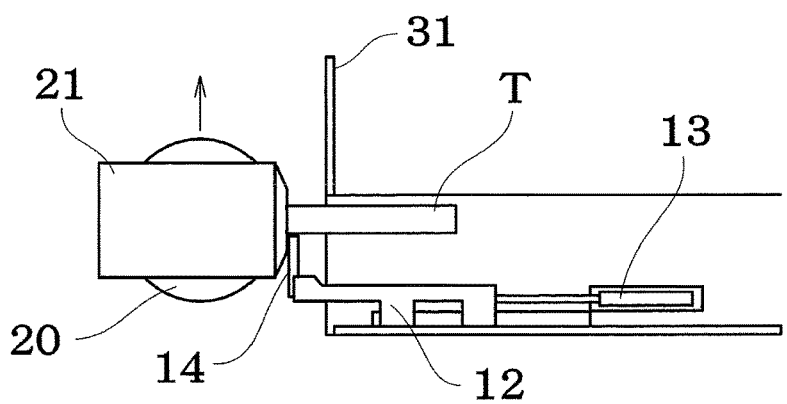
Figure 2D:
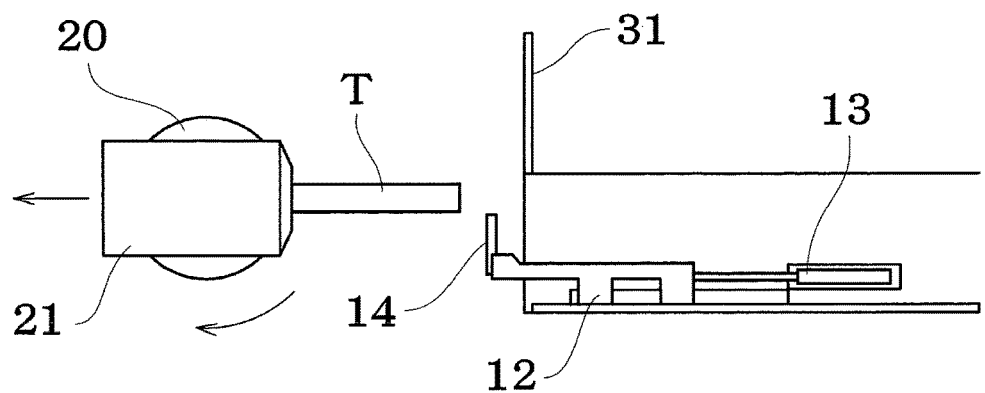

The tool T is thus delivered to the tool shaft 21 (see FIG. 2D). As illustrated in FIGS. 2A to 2D, since only the front end of the tool T protrudes from the shutter 31 into the working area, and the rear end of the tool T remain in the area 30 other than the working area, it is possible to reduce the space within the working area that required to deliver the tool T to the tool shaft 21 from the tool holder 12.

Note that the tool T is returned to the tool changer 10 from the tool shaft 21 by performing the above steps in reverse order. In this case, the backward position (tool reception position) of the tool holder 21 may be set to a constant position irrespective of the length of the tool T.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within the scope of this invention.

What is claimed is:

1. A tool machine comprising:
   a tool rest having a tool shaft;
   a shutter;
   a base member; and
   at least one tool changer unit,
   wherein a first tool changer unit of the at least one tool changer unit comprises:
      a tool holder that receives and holds a tool; and
      a moving mechanism that has a linear motion guide that extends parallel to a first axis, the moving mechanism also having a drive source, the drive source sliding the tool holder along the linear motion guide relative to the base member,
   wherein the base member supports the tool holder so that the tool holder can move forward along the first axis, which extends parallel to a longitudinal axis of the tool,
   wherein the shutter is configured to be opened and closed along a direction that intersects the first axis,
   wherein the tool holder comprises a clamp that is configured to sandwich a first end portion of the tool and hold the tool when the tool is moved downward, and release the tool when the tool is moved upward,
   wherein the clamp is configured to move forward along the first axis toward a delivery position at which the tool is delivered,
   wherein the clamp is provided at a first end of the tool holder along the first axis,
   wherein the clamp and the first end portion of the tool are configured to protrude outward from the shutter such that a second end portion of the tool, which is opposed to the first end portion of the tool, remains at a position inward of the shutter when the clamp is set to the delivery position of the tool,
   wherein the tool rest is configured to move toward the tool along the first axis so that the tool shaft chucks the tool, which is held by the clamp at the delivery position,
   wherein a second tool changer unit of the at least one tool changer unit comprises a second tool holder that receives and holds a second tool, the second tool holder being disposed on the base member and adjacent the tool holder with respect to a horizontal direction,
   wherein the second tool holder can move forward along a second linear motion guide and along a second axis that extends parallel to the first axis, and the second tool holder and the tool holder are able to be driven forward separately.

2. The tool machine as defined in claim 1,
   wherein a third tool changer unit of the at least one tool changer unit comprises a third tool holder that receives and holds a third tool, and
   the tool holder, the second tool holder, and the third tool holder are provided parallel to each other on the base member.

3. The tool machine as defined in claim 1,
   wherein the clamp comprises a pair of clamp arms that are rotatable in a vertical plane and are open on a side of the clamp, and the pair of clamp arms are biased in a direction in which the pair of clamp arms are closed.

4. A method for performing a tool change with the tool machine of claim 1, the method comprising:
   opening the shutter;
   selecting one of the first tool changer unit that includes the tool holder for holding the tool and the second tool changer unit that includes the second tool holder for holding the second tool;
   moving the selected one of the first tool changer unit and the second tool changer unit forward such that when the first tool changer unit is selected, the tool is moved forward to the delivery position, and when the second tool changer unit is selected, the second tool is moved forward to a second delivery position;
   moving the tool rest toward the selected one of the first tool changer unit and the second tool changer unit such that when the first tool changer unit is selected, the tool rest chucks the tool, and when the second tool changer unit is selected, the tool rest chucks the second tool; and
   moving the tool rest upward so as to remove the tool from the tool holder when the first tool changer unit is selected and remove the second tool from the second tool holder when the second tool changer unit is selected.

\* \* \* \* \*